(12) United States Patent
Akiyama (10) Patent No.: US 12,519,911 B2
(45) Date of Patent: Jan. 6, 2026

(54) ILLUMINATOR AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 324 days.

(21) Appl. No.: 18/242,857

(22) Filed: Sep. 6, 2023

(65) Prior Publication Data

US 2024/0080420 A1 Mar. 7, 2024

(30) Foreign Application Priority Data

Sep. 7, 2022 (JP) ................................. 2022-142111

(51) Int. Cl.
*G03B 21/20* (2006.01)
*H04N 9/31* (2006.01)

(52) U.S. Cl.
CPC ......... *H04N 9/3164* (2013.01); *H04N 9/3155* (2013.01)

(58) Field of Classification Search
CPC .............. G03B 21/208; G03B 21/2013; H04N 9/3164; H04N 9/3152
See application file for complete search history.

(56) References Cited

U.S. PATENT DOCUMENTS

| | | |
|---|---|---|
| 2017/0363943 A1 | 12/2017 | Kurosaki |
| 2019/0056646 A1 | 2/2019 | Akiyama |
| 2019/0124305 A1 | 4/2019 | Akiyama |
| 2019/0243225 A1 | 8/2019 | Akiyama |
| 2020/0186760 A1 | 6/2020 | Akiyama |

FOREIGN PATENT DOCUMENTS

| | | |
|---|---|---|
| JP | 2012-155048 A | 8/2012 |
| JP | 2015-161801 A | 9/2015 |
| JP | 2017-161654 A | 9/2017 |
| JP | 2017-227862 A | 12/2017 |
| JP | 2019-035922 A | 3/2019 |
| JP | 2019-061083 A | 4/2019 |
| JP | 2019-061110 A | 4/2019 |
| JP | 2019-078906 A | 5/2019 |
| JP | 2019-138940 A | 8/2019 |
| JP | 2020-095105 A | 6/2020 |

*Primary Examiner* — Ryan D Howard
(74) *Attorney, Agent, or Firm* — Oliff PLC (57) ABSTRACT

An illuminator includes a first light source that emits first light, a second light source that emits second light, a light combining member that combines the first light and the second light, a light diffuser that diffuses combined light, a light collector that is disposed between the light combining member and the light diffuser and directs the combined light toward the light diffuser, and a collimator that parallelizes the combined light emitted from the light diffuser. The light diffuser includes a diffusion plate having a diffusion surface that diffusively reflects the combined light, and a driver that rotates the diffusion plate. The diffusion surface inclines with respect to the optical axis of the light collector. An incidence position where the chief ray of the combined light is incident on the light collector is shifted with respect to the optical axis toward the side where the collimator is disposed.

8 Claims, 7 Drawing Sheets

ILLUMINATOR AND PROJECTOR

The present application is based on, and claims priority from JP Application Serial Number 2022-142111, filed Sep. 7, 2022, the disclosure of which is hereby incorporated by reference herein in its entirety.

BACKGROUND

1. Technical Field

The present disclosure relates to an illuminator and a projector.

2. Related Art

To enhance the performance of projectors, there has been a proposed projector including an illuminator using a laser light source, which is a light source with a wide color gamut and high efficiency. JP-A-2019-078906 discloses an illuminator including a blue light source array, a red light source array, a green light source array, a light combining system, a light correction lens, and a diffusion plate. The blue light source array, the red light source array, and the green light source array each include a plurality of semiconductor lasers.

JP-A-2019-078906 is an example of the related art.

The illuminator disclosed in JP-A-2019-078906 includes a transmissive diffusion plate that diffuses light incident via one surface thereof and causes the diffused light to exit via the other surface. Transmissive diffusion plates have problems of a difficulty in achieving a wide diffusion angle, and an attempt to achieve a large diffusion angle causing an increase in backscattered light and hence a decrease in the light utilization efficiency. To solve the problems, it is conceivable to use a reflective diffusion plate, but using a reflective diffusion plate causes the spread of the illuminance distribution of the light having exited out of the diffusion plate to be uneven with respect to the optical axis of the downstream optical system, and it is therefore necessary to increase the size of the downstream optical system, which captures the light having exited out of the diffusion plate.

SUMMARY

To solve the problems described above, an illuminator according to an aspect of the present disclosure includes a first light source that emits first light that belongs to a first wavelength band, a second light source that emits second light that belongs to a second wavelength band different from the first wavelength band, a light combining member that combines the first light and the second light with each other and causes the combined light to exit out of the light combining member, a light diffuser that diffuses the combined light that exits out of the light combining member, a light collector that is provided between the light combining member and the light diffuser and directs the combined light in the form of a spot toward the light diffuser, and a collimator that parallelizes the combined light that exits out of the light diffuser. The light diffuser includes a diffusion plate having a diffusion surface that diffusively reflects the combined light, and a driver that rotates the diffusion plate around an axis of rotation that intersects with the diffusion surface. The diffusion surface inclines with respect to an optical axis of the light collector. An incidence position where a chief ray of the combined light is incident on the light collector is shifted with respect to the optical axis of the light collector toward a side where the collimator is disposed.

A projector according to another aspect of the present disclosure includes the illuminator according to the aspect of the present disclosure, a light modulator that modulates light containing the combined light output from the illuminator, and a projection optical apparatus that projects the light modulated by the light modulator.

DESCRIPTION OF EMBODIMENTS

First Embodiment

A first embodiment of the present disclosure will be described below with reference to FIGS. 1 to 3.

A projector according to the present embodiment is an example of a liquid crystal projector including an illuminator using semiconductor lasers.

In the following drawings, components may be drawn at different dimensional scales for clarification of each of the components.

A projector 10 according to the present embodiment is a projection-type image display apparatus that displays a color image on a screen (projection receiving surface) SCR. The projector 10 includes three light modulators corresponding to three types of color light, red light LR, green light LG, and blue light LB. The projector 10 includes semiconductor lasers, which can produce high-luminance, high-power light, as light emitters of a light source apparatus.

Figure 1:
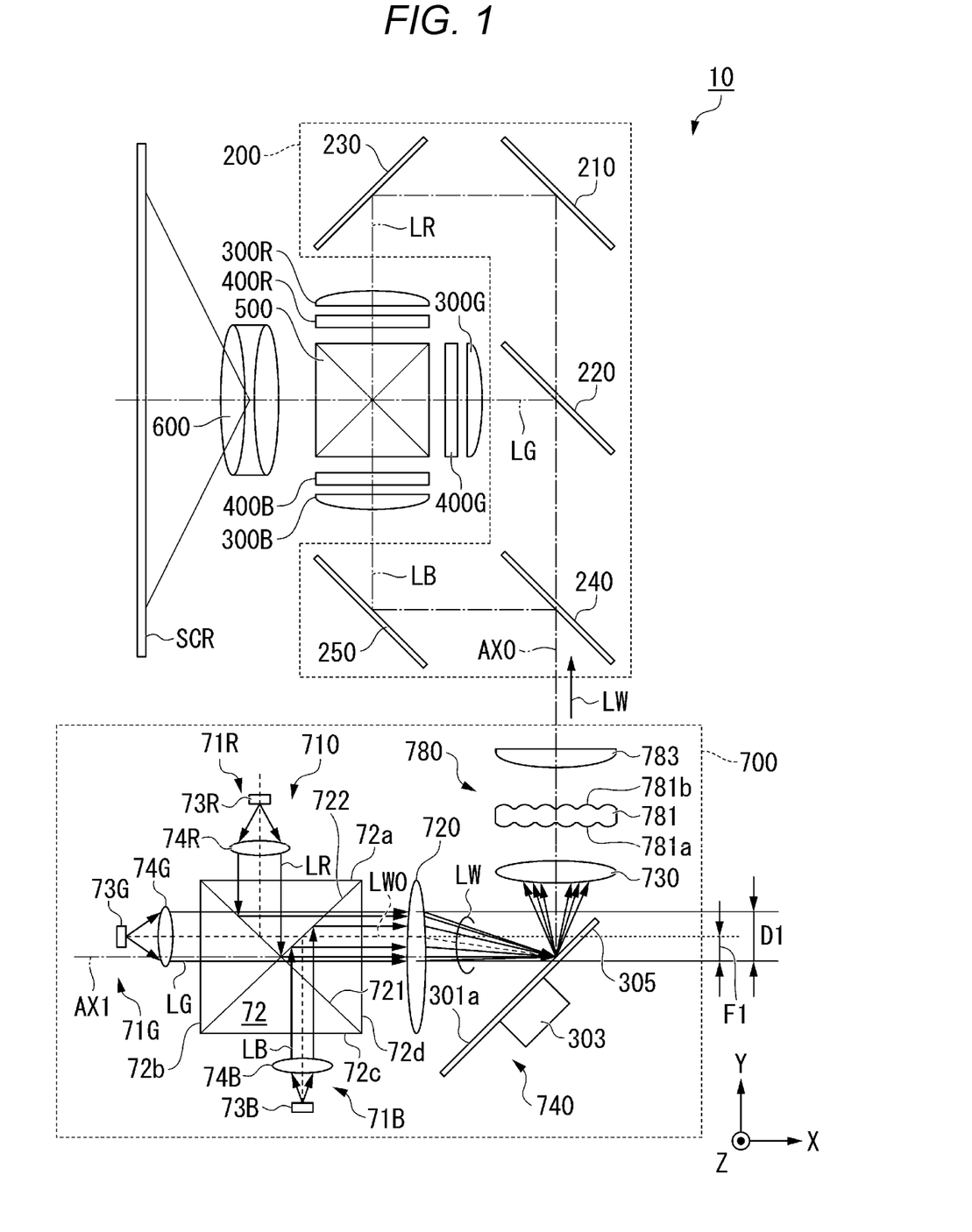
FIG. 1 is a schematic configuration diagram of a projector according to a first embodiment.

FIG. 1 is a schematic configuration diagram of the projector 10 according to the present embodiment.

The projector 10 includes an illuminator 700, a color separation and light guide system 200, a light modulator 400R for red light (light modulator), a light modulator 400G for green light (light modulator), and a light modulator 400B for blue light (light modulator), a light combining system 500, and a projection optical apparatus 600, as shown in FIG. 1. The light modulator 400R for red light, the light modulator 400G for green light, and the light modulator 400B for blue light form image light by modulating light containing combined light LW output from the illuminator 700 in accordance with image information. The projection optical apparatus 600 projects the image light.

The illuminator 700 includes a light source apparatus 710, a light collector 720, a light diffuser 740, a collimator 730, and an optical integration system 780. In the illuminator 700, the light diffuser 740, the collimator 730, and the optical integration system 780 are provided along an optical axis AX0, which coincides with the chief ray of the combined light LW output from the illuminator 700. The light source apparatus 710, the light collector 720, and the light diffuser 740 are provided along an optical axis AX1, which is perpendicular to the optical axis AX0.

The following description will be made on the assumption that a direction X is the direction in which the combined light LW is output from the light source apparatus 710, a direction Y is the direction in which the combined light LW is output from the illuminator 700, and a direction Z is the direction perpendicular to the directions X and Y. The optical axis AX1 is parallel to the axis X, and the optical axis AX0 is parallel to the axis Y.

The light source apparatus 710 includes a red light source 71R, a green light source 71G, a blue light source 71B, and a light combining member 72. The red light source 71R includes a red semiconductor laser 73R and a collimator lens 74R. The green light source 71G includes a green semiconductor laser 73G and a collimator lens 74G. The blue light source 71B includes a blue semiconductor laser 73B and a collimator lens 74B.

The red semiconductor laser 73R in the present embodiment corresponds to the first light source in the claims. The green semiconductor laser 73G in the present embodiment corresponds to the second light source in the claims.

The red semiconductor laser 73R outputs the red light LR, which belongs to a first wavelength band, toward the negative end of the direction Y. The first wavelength band is, for example, 635 nm±20 nm. The green semiconductor laser 73G outputs the green light LG, which belongs to a second wavelength band, toward the positive end of the direction X. The second wavelength band is, for example, 550 nm±30 nm. The blue semiconductor laser 73B outputs the blue light LB, which belongs to a third wavelength band, toward the positive end of the direction Y. The third wavelength band is, for example, 455 nm±20 nm.

The red light LR in the present embodiment corresponds to the first light in the claims. The green light LG in the present embodiment corresponds to the second light in the claims.

The collimator lens 74R parallelizes the red light LR emitted from the red semiconductor laser 73R. The collimator lens 74G parallelizes the green light LG emitted from the green semiconductor laser 73G. The collimator lens 74B parallelizes the blue light LB emitted from the blue semiconductor laser 73B. FIG. 1 shows one semiconductor laser and one collimator lens as each of the light sources 71R, 71G, and 71B, but the number of semiconductor lasers and collimator lenses and the arrangement thereof are not limited to a specific number and arrangement. The light sources 71R, 71G, and 71B may each have other members, such as a package that holds the semiconductor laser and the collimator lens.

The light combining member 72 is formed, for example, of a cross dichroic prism. The cross dichroic prism includes a first dichroic mirror 721 and a second dichroic mirror 722. The first dichroic mirror 721 and the second dichroic mirror 722 are disposed in directions that intersect with each of the axes X and Y at 45°. The first dichroic mirror 721 reflects the red light LR and transmits the green light LG and the blue light LB. The second dichroic mirror 722 reflects the blue light LB and transmits the green light LG and the red light LR.

The red light source 71R is disposed to face a first surface 72a of the light combining member 72 and outputs the red light LR toward the first surface 72a. The green light source 71G is disposed to face a second surface 72b of the light combining member 72 and outputs the green light LG toward the second surface 72b. The blue light source 71B is disposed to face a third surface 72c of the light combining member 72 and outputs the blue light LB toward the third surface 72c. The combined light LW, which is white light that is the combination of the red light LR, the green light LG, and the blue light LB, exits via a fourth surface 72d of the light combining member 72.

The red light source 71R is disposed at a position shifted toward the negative end of the direction X from an imaginary line extending perpendicularly to the first surface 72a and passing through the intersection of the first dichroic mirror 721 and the second dichroic mirror 722. That is, the red light source 71R is disposed at a position shifted from the imaginary line extending perpendicularly to the first surface 72a and passing through the intersection described above toward the side opposite from the side where the light diffuser 740 is disposed. The green light source 71G is disposed at a position shifted toward the positive end of the direction Y from an imaginary line (optical axis AX1) extending perpendicularly to the second surface 72b and passing through the intersection of the first dichroic mirror 721 and the second dichroic mirror 722. That is, the green light source 71G is disposed at a position shifted from the imaginary line extending perpendicularly to the second surface 72b and passing through the intersection described above toward the side where the collimator 730 is disposed. The blue light source 71B is disposed at a position shifted toward the positive end of the direction X from an imaginary line extending perpendicularly to the third surface 72c and passing through the intersection of the first dichroic mirror 721 and the second dichroic mirror 722. That is, the blue light source 71B is disposed at a position shifted from the imaginary line extending perpendicularly to the third surface 72c and passing through the intersection described above toward the side where the light diffuser 740 is disposed. The thus disposed light sources 71R, 71G, and 71B cause the combined light LW to exit from a position shifted toward the positive end of the direction Y from an imaginary line (optical axis AX1) extending perpendicularly to the fourth surface 72d and passing through the intersection of the first dichroic mirror 721 and the second dichroic mirror 722. That is, a chief ray LW0 of the combined light LW that exits out of the light source apparatus 710 is shifted from the optical axis AX1 toward the positive end of the direction Y.

The thus configured light source apparatus 710 outputs the white combined light LW containing the blue light LB, the green light LG, and the red light LR. The red light LR emitted from the red semiconductor laser 73R, the green light LG emitted from the green semiconductor laser 73G, and the blue light LB emitted from the blue semiconductor laser 73B are each linearly polarized light. The polarization directions of the blue light LB, the green light LG, and the red light LR, which constitute the combined light LW, coincide with each other at the point of time when they exit out of the light combining member 72.

The light collector 720 is provided between the light combining member 72 and the light diffuser 740. The light collector 720 directs the combined light LW output from the light source apparatus 710 in the formed of a spot toward the light diffuser 740. Specifically, the light collector 720 causes the combined light LW to be incident in the form of a spot on a diffusion plate 305 of the light diffuser 740. The light collector 720 is formed of a convex lens. The light collector 720 may be formed of a plurality of lenses. Since the optical axis of the light collector 720 coincides with the optical axis AX1, the optical axis of the light collector 720 is called the optical axis AX1.

The position where the chief ray LW0 of the combined light LW is incident on the light collector 720 is shifted from the optical axis AX1 of the light collector 720 toward the side where the collimator 730 is disposed (positive end of direction Y). In other words, the position where the chief ray LW0 of the combined light LW is incident on the light collector 720 is shifted from the optical axis AX1 of the light collector 720 in the traveling direction of the combined light LW output from the light diffuser 740 (toward positive end of direction Y). An amount of shift F1 of the incidence position of the chief ray LW0 from the optical axis AX1 of the light collector 720 is desirably greater than or equal to ½ of a luminous flux diameter D1 of the combined light LW before it enters the light collector 720.

The luminous flux diameter D1 of the combined light LW is the outer diameter of the combined light LW viewed in the direction perpendicular to both the direction in which the red light LR from the red light source 71R exits and the blue light LB from the blue light source 71B exits and the direction in which the green light LG from the green light source 71G exits, which is perpendicular to the direction in which the red light LR and blue light LB exit. That is, the direction perpendicular to both the direction in which the blue light LB from the blue light source 71B exits and the direction in which the green light LG from the green light source 71G exits is perpendicular to the plane of view of FIG. 1. The amount of shift F1 of the incidence position of the chief light ray LW0 is the distance between the optical axis AX1 and the point where the chief ray LW0 is incident on the light incident surface of the light collector 720.

Figure 2:
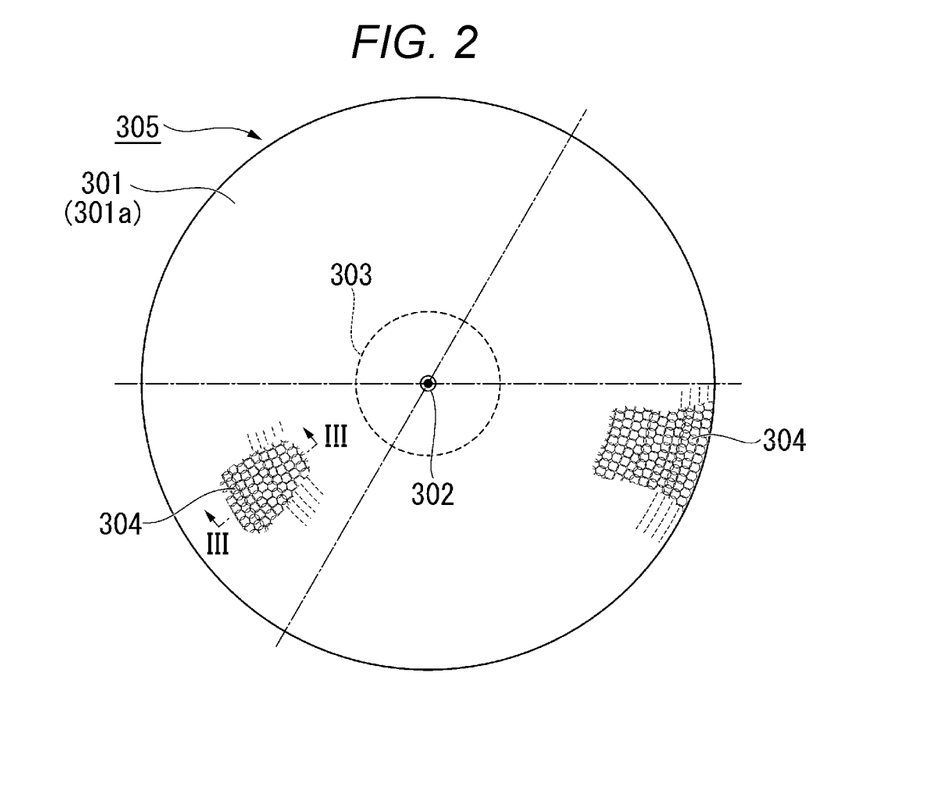
FIG. 2 is a front view of the diffusion plate.

FIG. 2 is a front view of the diffusion plate 305. FIG. 3 is a cross-sectional view of the diffusion plate 305 taken along the line III-III in FIG. 2.

Figure 3:
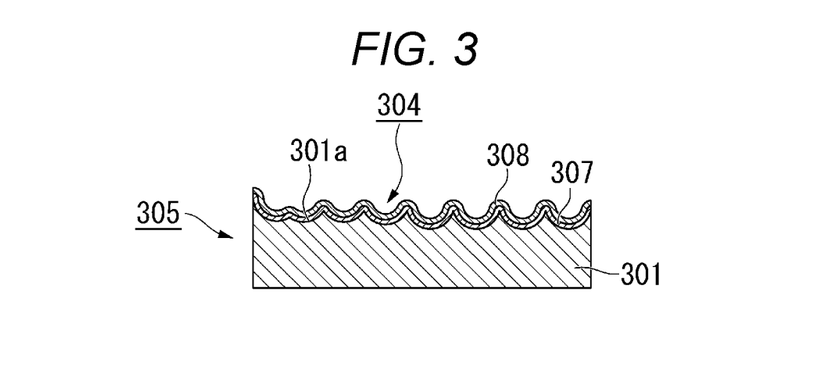
FIG. 3 is a cross-sectional view of the diffusion plate taken along the line III-III in FIG. 2.

The light diffuser 740 includes a disk-shaped diffusion plate 305 and a driver 303, as shown in FIGS. 2 and 3. The diffusion plate 305 has a diffusion surface 301a, which diffusively reflects the combined light LW having exited out of the light collector 720. That is, the diffusion plate 305 in the present embodiment is not a transmissive diffusion plate but is a reflective diffusion plate. The diffusion plate 305 is disposed at a predetermined position where the light collector 720 collects the combined light LW. The driver 303 is formed of a motor and rotates the diffusion plate 305 around an axis of rotation 302, which intersects with the diffusion surface 301a. The diffusion surface 301a in the present specification does not mean a curved surface having the shape of a minute uneven structure, which will be described later, but is a single surface along which a plurality of protrusions and recesses are generally arranged.

The diffusion plate 305 is so disposed that the diffusion surface 301a inclines by an angle of 45° with respect to each of the optical axes AX0 and AX1, as shown in FIG. 1. That is, the diffusion surface 301a inclines by 45° with respect to the optical axis AX1 of the light collector 720. The phrase "inclines by 45°" is not limited only to inclination of 45°, but means that a deviation of ±5° from 45° is allowed.

According to the configuration described above, the traveling direction of the chief ray LW0 of the combined light LW incident on the diffusion surface 301a and the traveling direction of the chief ray LW0 of the combined light LW having exited via the diffusion surface 301a can be made substantially perpendicular to each other. The arrangement described above simplifies the configuration of the illuminator 700 including the reflective diffusion plate 305.

The diffusion plate 305 includes a base 301, a reflective film 307, and a dielectric multilayer film 308, as shown in FIG. 3.

The base 301 is made of an aluminum alloy. The aluminum alloy may, for example, be an Al—Mg—Si-based alloy, which is aluminum (Al) to which magnesium (Mg) and silicon (Si) are added. The aluminum alloy may contain other elements, such as iron (Fe), copper (Cu), manganese (Mn), chromium (Cr), zinc (Zn), and titanium (Ti).

Out of the two surfaces of the base 301, an uneven structure 304 formed of a plurality of protrusions and a plurality of recesses is provided at the diffusion surface 301a, on which the combined light is incident. The uneven structure 304 has a plurality of randomly arranged curved surfaces. That is, the base 301 has the uneven structure 304 including a plurality of protrusions and a plurality of recesses. The individual recesses each have a spherical shape. The depth of each of the recesses is, for example, about ¼ of the diameter of the spherical surface. The uneven structure 304 can be formed by scraping the base 301, for example, in an etching process, or by plastic deformation, for example, in a blasting process.

In a cross section of the diffusion surface 301a taken along the radial direction, the overall radial length of a set of one protrusion and one recess adjacent to each other differs from the overall radial length of another set of one protrusion and one recess adjacent to each other. The overall radial length of a set of one protrusion and one recess adjacent to each other is defined as the radial protrusion-recess interval. In other words, in a cross section of the diffusion surface 301a taken along the radial direction, the protrusion-recess interval between a set of one protrusion and one recess adjacent to each other differs from the protrusion-recess intervals between another set of one protrusion and one recess adjacent to each other. That is, the intervals between the sets of the protrusions and recesses that form the uneven structure are randomly selected values in a cross section of the diffusion surface 301a taken along the radial direction. The radial direction in the present embodiment corresponds to the first direction in the claims.

In a cross section of the diffusion surface 301a taken along the radial direction, the overall shape of a set of one protrusion and one recess adjacent to each other differs from the overall shape of another set of one protrusion and one recess adjacent to each other. That is, the protrusion-recess shapes are randomly selected shapes in a cross section of the diffusion surface 301a taken along the radial direction.

Providing the uneven structure 304 with the diffusion surface 301a having random intervals and shape allows reduction in the coherence of the combined light. Speckle noise in an image formed by the projector 10 can thus be effectively suppressed.

The aluminum alloy may instead, for example, be any of 1000-series wrought aluminum alloys, such as those having JIS alloy names A1050, A1070, and A1085. An alloy of this type has excellent workability, which readily allows pressing, cutting, or other types of processing to form external shapes, and plastic deformation to form surface shapes. In addition, any of 6000-series wrought aluminum alloys, such as those having JIS alloy names A6061 and A6063 may be used. An alloy of this type excels in strength, and surface cutting or plastic deformation performed thereon does not very often cause microcracks, which cause tears in the reflective film 307, or other defects. Other wrought aluminum alloys, and aluminum alloys for die-casting or casting can be selected as appropriate depending on the performance of the selected material and the method for processing the material.

The reflective film 307 is provided along the uneven structure 304 of the base 301. The reflective film 307 is made of an aluminum-containing material. Specifically, the reflective film 307 is made of high-purity aluminum having an aluminum content greater than or equal to 99.99 wt %. The reflective film 307 can be preferably made of ultra-high-purity aluminum having an aluminum content greater than or equal to 99.999 wts.

The reflective film 307 is produced by using sputtering, vapor deposition, or any other film formation method to form a pure aluminum film having a predetermined thickness and a smooth surface on the diffusion surface 301a of the base 301. When a sputtering target having an aluminum content of, for example, 99.999 wt % is used in the film formation step, the reflectance film 307 made of ultra-high-purity aluminum having an aluminum content of 99.999 wt % is produced.

The dielectric multilayer film 308 is provided at the surface of the reflective film 307 that is opposite from the base 301. Although not shown in FIG. 3, the dielectric multilayer film 308 has a configuration in which two kinds of dielectric films having refractive indices different from each other are alternately layered on each other.

In the diffusion plate 305 in the present embodiment, the uneven structure 304 reflects once the combined light LW having exited out of the light combining member 72 and causes the reflected combined light LW to exit toward the collimator 730. The combined light LW having exited out of the light combining member 72 therefore exits out of the diffusion plate 305 toward the collimator 730 without being reflected multiple times at the diffusion surface 301a. According to the configuration described above, the combined light LW having exited out of the light combining member 72 is not reflected multiple times off the diffusion surface 301a, so that disturbance of the polarization direction of the combined light LW can be suppressed. The diffusion plate 305 may be a microlens-array-type diffusion plate including a microlens array.

The collimator 730 is formed of a collimator lens formed, as shown in FIG. 1.

The collimator 730 parallelizes the combined light LW output having exited out of the light diffuser 740 and causes the parallelized combined light LW to exit toward the optical integration system 780. In the present embodiment, the collimator 730 is formed of a single convex lens. The collimator 730 may be formed of a plurality of lenses.

The optical integration system 780 includes a multi-lens array 781 and a superimposing lens 783. The optical integration system 780 homogenizes the illuminance distribution of the combined light LW having exited out of the collimator 730 at an image formation region of each of the light modulator 400R for red light, the light modulator 400G for green light, and the light modulator 400B for blue light.

In the present embodiment, the multi-lens array 781 is formed of a double-sided multi-lens array having a first multi-lens surface 781a and a second multi-lens surface 781b integrated with the body of the multi-lens array 781. The first multi-lens surface 781a includes a plurality of lenses that divide the combined light LW having exited out of the collimator 730 into a plurality of sub-luminous fluxes. The plurality of lenses are arranged in a matrix in a plane perpendicular to the illumination optical axis AX0. The first multi-lens surface 781a and the second multi-lens surface 781b may be provided as surfaces of two separate multi-lens arrays.

The second multi-lens surface 781b includes a plurality of second lenses corresponding to the plurality of lenses 781a of the first multi-lens surface 781a. The second multi-lens surface 781b, along with the superimposed lens 783, which is downstream from the multi-lens array 781, forms an image of each of the lenses of the first multi-lens surface 781a at or in the vicinity of the image formation region of each of the light modulator 400R for red light, the light modulator 400G for green light, and the light modulator 400B for blue light. The plurality of lenses are arranged in a matrix in a plane perpendicular to the illumination optical axis AX0.

The superimposing lens 783 collects the plurality of sub-luminous fluxes having exited out of the multi-lens array 781 into spots to cause the spots to be superimposed on each other at or in the vicinity of the image formation region of each of the light modulator 400R for red light, the light modulator 400G for green light, and the light modulator 400B for blue light.

The color separation and light guide system 200 includes dichroic mirrors 240 and 220, and reflection mirrors 210, 230, and 250. The color separation and light guide system 200 separates the white combined light LW output from the illuminator 700 into the red light LR, the green light LG, and the blue light LB, and guides the red light LR, the green light LG, and the blue light LB to the corresponding light modulator 400R for red light, light modulator 400G for green light, and light modulator 400B for blue light.

A field lens 300R is disposed between the color separation and light guide system 200 and the light modulator 400R for red light. A field lens 300G is disposed between the color separation and light guide system 200 and the light modulator 400G for green light. A field lens 300B is disposed between the color separation and light guide system 200 and the light modulator 400B for blue light.

The dichroic mirror 240 reflects the blue light LB and transmits the red light LR and the green light LG. The dichroic mirror 220 reflects the green light LG and transmits the blue light LB. The reflection mirrors 210 and 230 each reflect the red light LR. The reflection mirror 250 reflects the blue light component LB.

The light modulator 400R for red light, the light modulator 400G for green light, and the light modulator 400B for blue light are each formed of a liquid crystal panel that forms an image by modulating color light incident thereon in accordance with image information.

Although not shown, a light-incident-side polarizer is disposed between each of the following two components:

the field lens 300R and the light modulator 400R for red light; between the field lens 300G and the light modulator 400G for green light; and between the field lens 300B and the light modulator 400B for blue light. A light-exiting-side polarizer is disposed between each of the following two components: the light modulator 400R for red light and the light combining system 500; between the light modulator 400G for green light and the light combining system 500; and between the light modulator 400B for blue light and the light combining system 500.

The light combining system 500 combines the image light output from the light modulator 400R for red light, the image light output from the light modulator 400G for green light, and the image light output from the light modulator 400B for blue light with one another. The light combining system 500 is formed of a cross dichroic prism that is formed of four right-angled prisms bonded to each other and has a substantially square shape in a plan view. In the cross dichroic prism, dielectric multilayer films are provided at the substantially X-letter-shaped interfaces between the right-angled prisms bonded to each other.

The image light having exited out of the light combining system 500 is enlarged and projected on the screen SCR by the projection optical apparatus 60. The projection optical apparatus 600 is formed of a plurality of lenses.

Comparative Example

An illuminator 800 according to Comparative Example will be descried below.

Figure 4:
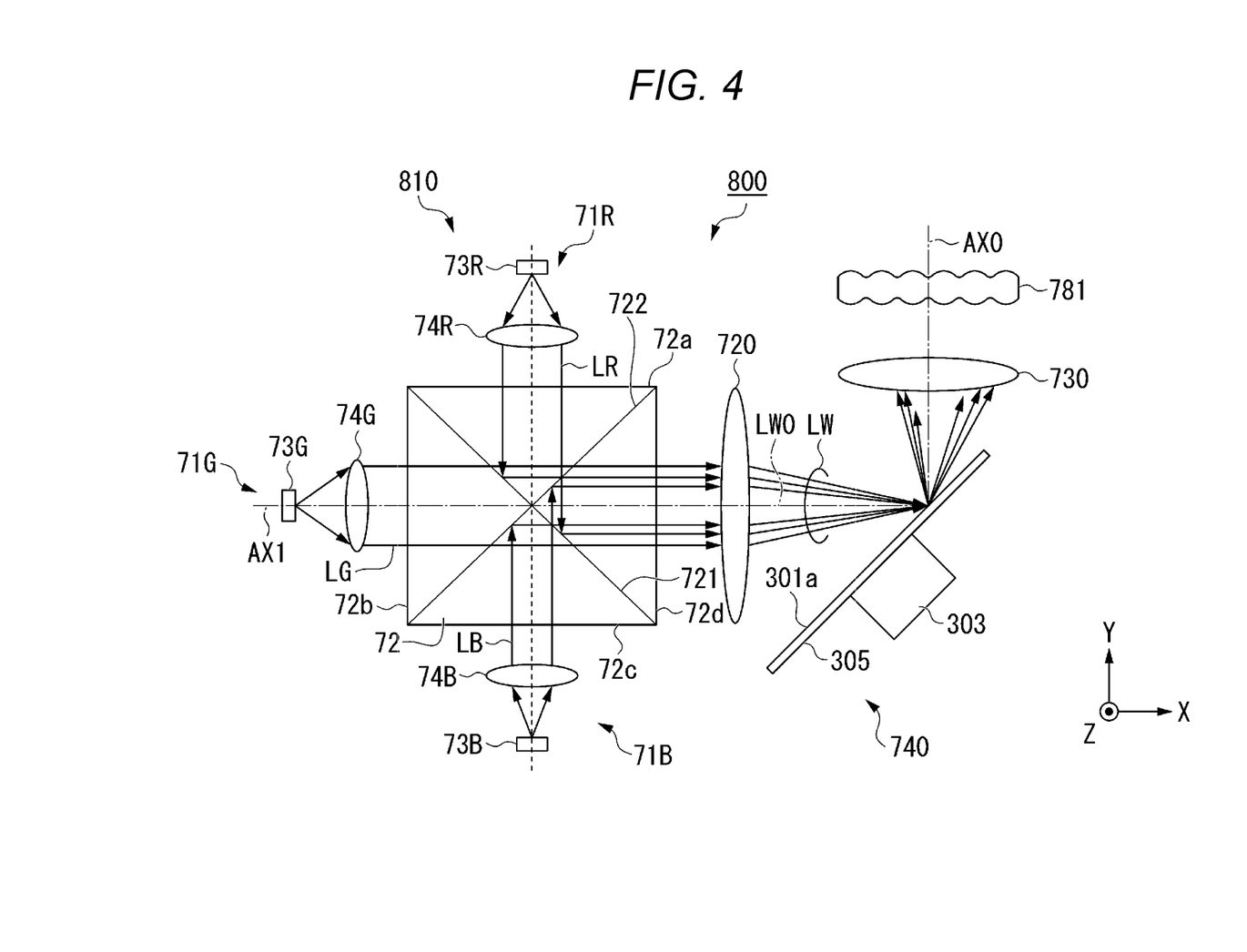
FIG. 4 is a schematic configuration diagram of an illuminator according to Comparative Example.

FIG. 4 is a schematic configuration diagram of the illuminator 800 according to Comparative Example.

In FIG. 4, components common to those in FIG. 1 have the same reference characters and will not be described.

The illuminator 800 according to Comparative Example includes a light source apparatus 810, the light collector 720, the light diffuser 740, the collimator 730, and the multi-lens array 781, as shown in FIG. 4. The light source apparatus 810 includes the red light source 71R, the green light source 71G, the blue light source 71B, and the light combining member 72.

The red light source 71R is disposed on an imaginary line extending perpendicularly to the first surface 72a and passing through the intersection of the first dichroic mirror 721 and the second dichroic mirror 722. The green light source 71G is disposed on an imaginary line (optical axis AX1) extending perpendicularly to the second surface 72b and passing through the intersection of the first dichroic mirror 721 and the second dichroic mirror 722. The blue light source 71B is disposed on an imaginary line extending perpendicularly to the third surface 72c and passing through the intersection of the first dichroic mirror 721 and the second dichroic mirror 722. The thus disposed light sources 71R, 71G, and 71B cause the combined light LW to exit along an imaginary line (optical axis AX1) extending perpendicularly to the fourth surface 72d and passing through the intersection of the first dichroic mirror 721 and the second dichroic mirror 722. That is, the chief ray LW0 of the combined light LW output from the light source apparatus 810 coincides with the optical axis AX1.

In this case, the angular distribution of the combined light LW having exited out of the light collector 720 is symmetrical with respect to the optical axis AX1 of the light collector 720. However, when the combined light LW enters the diffuser 305 at the angle of 45°, the angular distribution of the combined light LW having exited out of the diffusion plate 305 is not symmetrical with respect to the optical axis AX0 because the diffusion plate 305 has directionality. Specifically, the combined light LW having exited out of the diffusion plate 305 is so diffused that the distribution of the shifted combined light LW is shifted toward the side where the angle of reflection with respect to a normal to the light diffusing surface 301a is greater. That is, the combined light LW having exited out of the diffusion plate 305 is diffused at a wider angle toward the positive end of the direction X than toward the negative end of the direction X with respect to the optical axis AX0.

The present inventor conducted a simulation on the illuminance distribution of each of the red light, the green light, and the blue light, which constitute the combined light LW having exited out of the diffusion plate 305, in the illuminator 800 according to Comparative Example.

Figure 5:
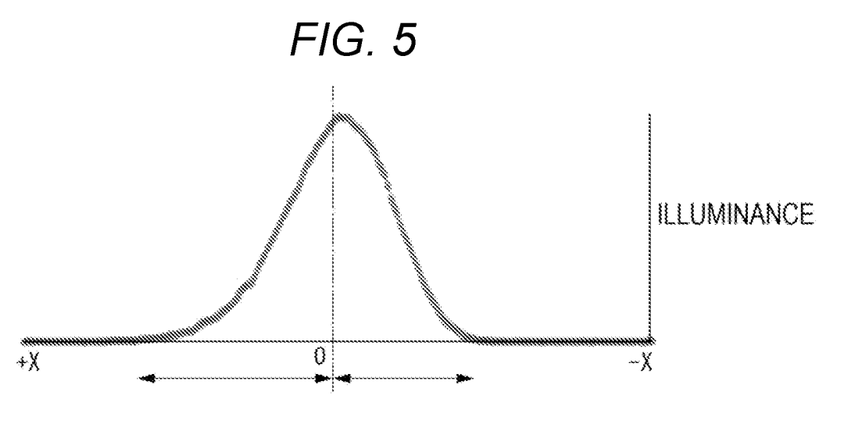
FIG. 5 shows the illuminance distribution of red light having exited out of the diffusion plate in the illuminator according to Comparative Example.
Figure 6:
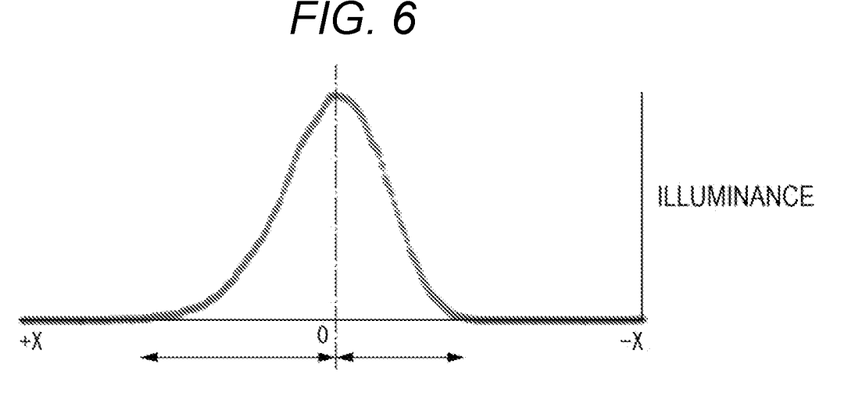
FIG. 6 shows the illuminance distribution of green light having exited out of the diffusion plate in the illuminator according to Comparative Example.
Figure 7:
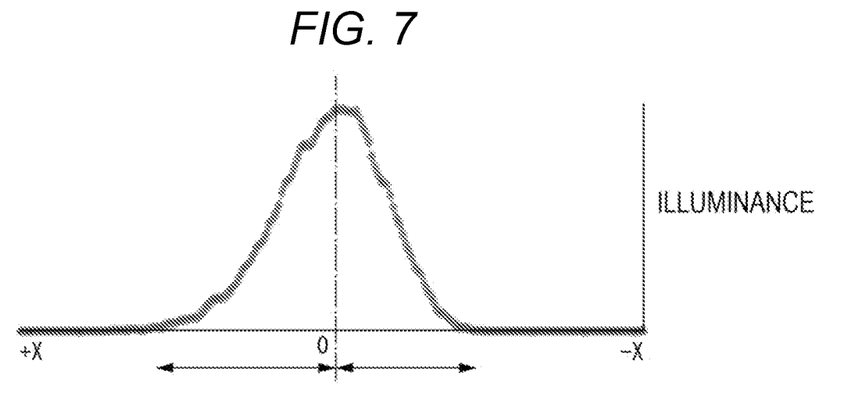
FIG. 7 shows the illuminance distribution of blue light having exited out of the diffusion plate in the illuminator according to Comparative Example.

FIGS. 5 to 7 show the results of the simulation. FIG. 5 shows the illuminance distribution of the red light having exited out of the diffusion plate 305. FIG. 6 shows the illuminance distribution of the green light having exited out of the diffusion plate 305. FIG. 7 shows the illuminance distribution of the blue light having exited out of the diffusion plate 305. In the drawings, the horizontal axis represents the X coordinate and is shown with respect to the optical axis AX0 as the reference. That is, the value of the X coordinate of the reference is zero. The vertical axis represents the illuminance. Note that the X coordinate and the illuminance are each expressed by a relative value.

The illuminance distribution of each of the red light, the green light, and the blue light peaks substantially at a position on the optical axis AX0, as shown in FIGS. 5 to 7. Looking at the skirts of the illuminance distribution, however, it shows that the skirt on the side toward the positive end of the direction X extends longer than the skirt on the side toward the negative end of the direction X.

Therefore, in the illuminator 800 according to Comparative Example, when the size of the collimator 730 is small, part of the combined light LW reflected toward the positive end of the direction X out of the combined light LW output from the diffusion plate 305 may not undesirably enter the collimator 730. A problem of a decrease in the efficiency of use of the combined light LW thus occurs. When the size of the collimator 730 is increased in order not to cause the decrease in the efficiency of use of the combined light LW, the collimator 730 interferes with the diffusion plate 305, so that it is difficult to arrange these optical components.

Example 1

The present inventor conducted a simulation on the illuminance distribution of each of the red light, the green light, and the blue light, which constitute the combined light LW having exited out of the diffusion plate 305, in the illuminator 700 according to the present embodiment, as in Comparative Example described above.

Figure 8:
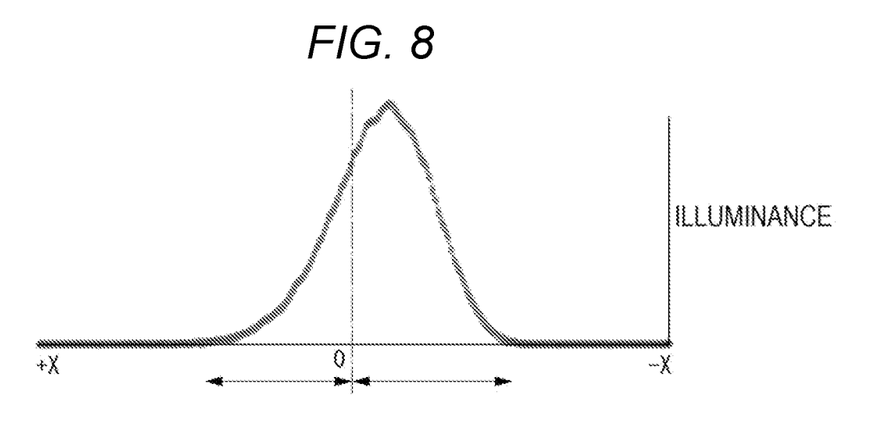
FIG. 8 shows the illuminance distribution of the red light having exited out of the diffusion plate in the illuminator according to Example 1.
Figure 9:
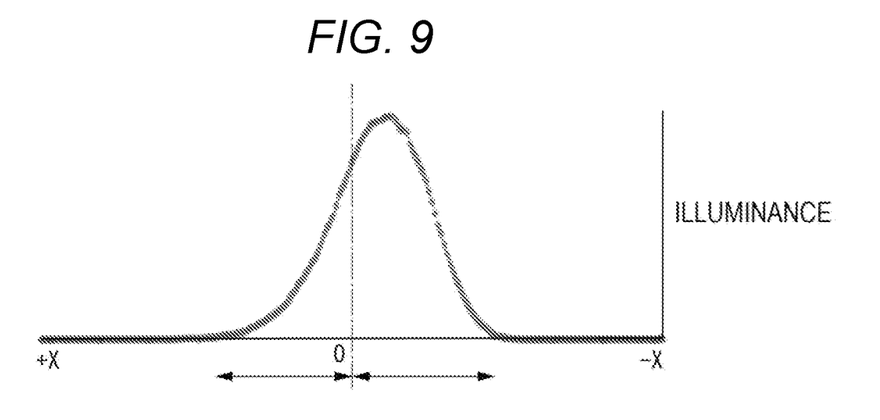
FIG. 9 shows the illuminance distribution of the green light having exited out of the diffusion plate in the illuminator according to Example 1.
Figure 10:
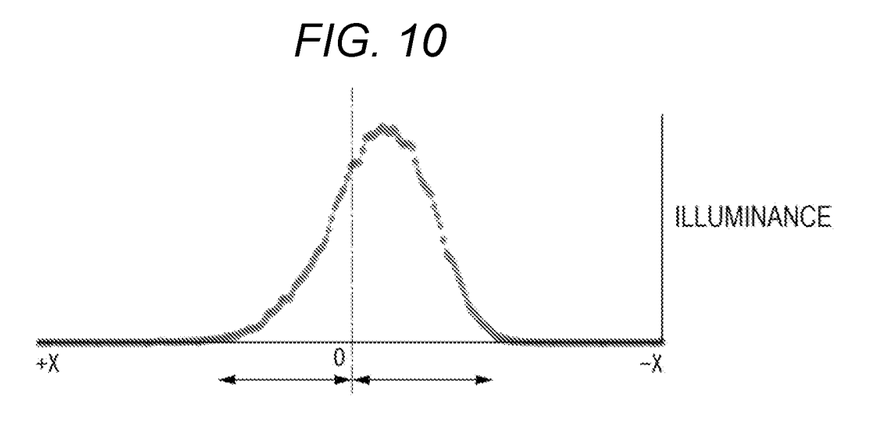
FIG. 10 shows the illuminance distribution of the blue light having exited out of the diffusion plate in the illuminator according to Example 1.

FIGS. 8 to 10 show the results of the simulation performed on the illuminator according to Example 1. FIG. 8 shows the illuminance distribution of the red light having exited out of the diffusion plate 305. FIG. 9 shows the illuminance distribution of the green light having exited out of the diffusion plate 305. FIG. 10 shows the illuminance distribution of the blue light having exited out of the diffusion plate 305. In the drawings, the horizontal axis represents the X coordinate and is shown with respect to the optical axis AX0 as the reference. That is, the value of the X coordinate of the reference is zero. The vertical axis represents the illuminance. Note that the X coordinate and the illuminance are each expressed by a relative value.

As the conditions of the simulation in Example 1, the amount of shift F1 of the incidence position of the chief ray LW0 from the optical axis AX1 of the light collector 720 is set at ½ of the luminous flux diameter D1 of the combined light LW before it enters the light collector 720.

The peak of the illuminance distribution of each of the red light, the green light, and the blue light moves from the optical axis AX0 toward the negative end of the direction X by the shift of the incidence position of the chief ray LW0 from the optical axis AX1 of the light collector 720 toward the positive end of the direction Y, as shown in FIGS. 8 to 10. However, looking at the skirts of the illuminance distribution, it shows that the distances from the optical axis AX0 to the ends of the skirts of the illuminance distribution are roughly equal to each other at the sides facing the positive and negative ends of the direction X, unlike in Comparative Example.

Example 2

Figure 11:
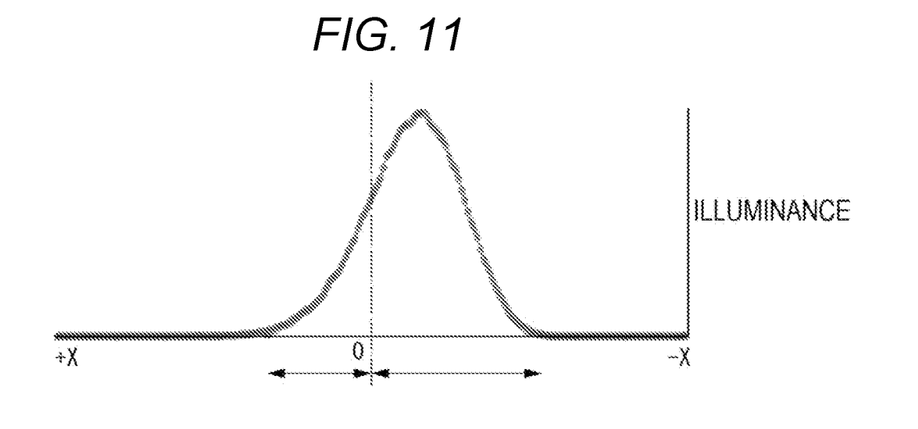
FIG. 11 shows the illuminance distribution of the red light having exited out of the diffusion plate in the illuminator according to Example 2.
Figure 12:
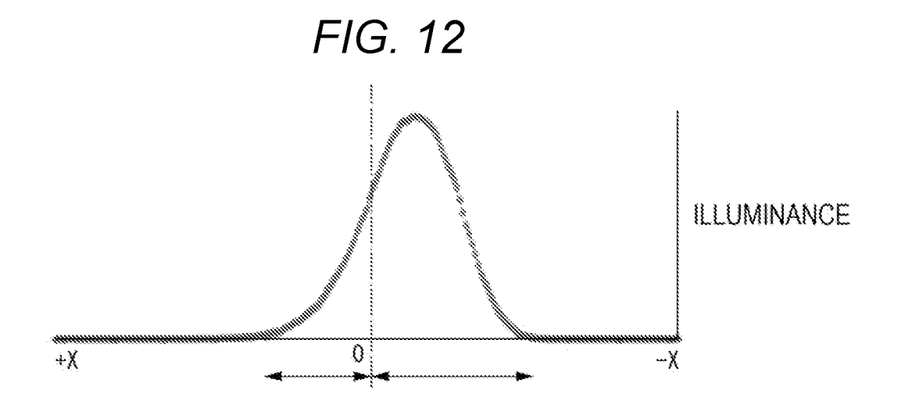
FIG. 12 shows the illuminance distribution of the green light having exited out of the diffusion plate in the illuminator according to Example 2.
Figure 13:
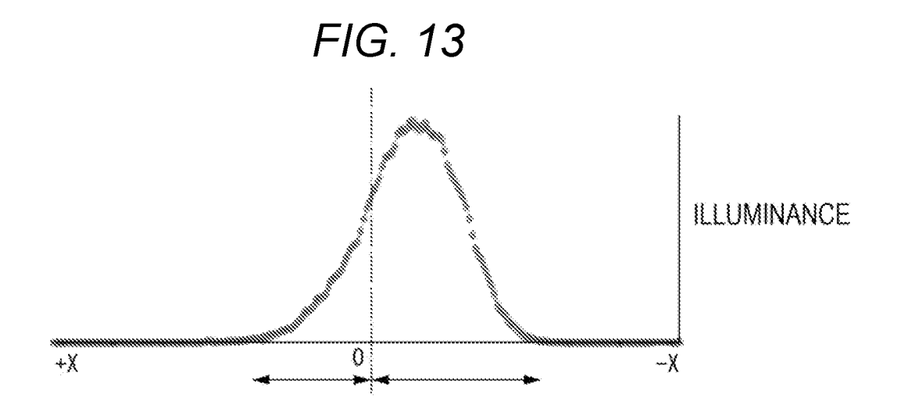
FIG. 13 shows the illuminance distribution of the blue light having exited out of the diffusion plate in the illuminator according to Example 2.

FIGS. 11 to 13 show the results of the simulation performed on the illuminator according to Example 2. FIG. 11 shows the illuminance distribution of the red light having exited out of the diffusion plate 305. FIG. 12 shows the illuminance distribution of the green light having exited out of the diffusion plate 305. FIG. 13 shows the illuminance distribution of the blue light having exited out of the diffusion plate 305. In the drawings, the horizontal axis represents the X coordinate and is shown with respect to the optical axis AX0 as the reference. That is, the value of the X coordinate of the reference is zero. The vertical axis represents the illuminance. Note that the X coordinate and the illuminance are each expressed by a relative value.

As the conditions of the simulation in Example 2, the amount of shift F1 of the incidence position of the chief ray LW0 of the combined light LW from the optical axis AX1 of the light collector 720 is set at ⅔ of the luminous flux diameter D1 of the combined light LW, which is greater than that in Example 1, before it enters the light collector 720.

The peak of the illuminance distribution of each of the red light, the green light, and the blue light moves from the position on the optical axis AX0 toward the negative end of the direction X, as shown in FIGS. 11 to 13. Looking at the skirts of the illuminance distribution, it shows that the distances from the optical axis AX0 to the ends of the skirts of the illuminance distribution at the sides facing the positive and negative ends of the direction X differ from each other, but the difference is smaller than that in Comparative Example. On the other hand, it is further ascertained as compared with Example 1 that the distance from the optical axis AX0 to the end of the skirt of the illuminance distribution extending toward the negative end of the direction X is longer than the distance to the end of skirt extending toward the positive end of the direction X for each of the colors. That is, it can be ascertained that the distances from the optical axis AX0 to the ends of the skirts of the illuminance distribution at the sides facing the positive and negative ends of the direction X are off balance again.

The results of Examples 1 and 2 show that shifting the incidence position where the chief ray LW0 of the combined light LW is incident on the light collector 720 from the optical axis AX1 toward the side where the collimator 730 is disposed can suppress the phenomenon in which the combined light LW having exited out of the diffusion plate 305 diffuses unevenly in a specific direction, whereby the problems described above with Comparative Example can be solved.

According to the present inventor's study, when the amount of shift F1 of the incidence position of the chief ray LW0 from the optical axis AX1 of the light collector 720 is greater than ⅔ of the luminous flux diameter D1 of the combined light LW, the difference between the illuminance distribution in the region facing the negative end of the direction X excessively differs from the illuminance distribution in the region facing the positive end of the direction X. In this case, the angle of incidence of the light eventually incident on the light modulators may be significantly off balance, which may degrade the image quality. Therefore, based on the results of the simulation performed in Examples 1 and 2, it is desirable that the amount of shift F1 of the incidence position of the chief ray LW0 from the optical axis AX1 of the light collector 720 is greater than or equal to ½ of the luminous flux diameter D1 of the combined light LW but smaller than or equal to ⅔ of the luminous flux diameter D1.

Effects of First Embodiment

The illuminator 700 according to the present embodiment includes the red light source 71R, which emits the red light LR, which belongs to the first wavelength band, the green light source 71G, which emits the green light LG, which belongs to the second wavelength band different from the first wavelength band, the blue light source 71B, which emits the blue light LB, which belongs to the third wavelength band different from the first and second wavelength bands, the light combining member 72, which combines the red light LR, the green light LG, and the blue light LB with one another and causes the combined light LW to exit out of the light combining member 72, the light diffuser 740, which diffuses the combined light LW having exited out of the light combining member 72, the light collector 720, which is provided between the light combining member 72 and the light diffuser 740 and directs the combined light LW in the form of a spot toward the light diffuser 740, and the collimator 730, which parallelizes the combined light LW having exited out of the light diffuser 740. The light diffuser 740 includes the diffusion plate 305, which has the diffusion surface 301a, which diffusively reflects the combined light LW, and the driver 303, which rotates the diffusion plate 305 around the axis of rotation 302, which intersects with the diffusion surface 301a. The diffusion surface 301a inclines with respect to the optical axis AX1 of the light collector 720. The incidence position where the chief ray LW0 of the combined light LW is incident on the light collector 720 is shifted from the optical axis AX1 of the light collector 720 toward the side where the collimator 730 is disposed.

The illuminator 700 according to the present embodiment allows suppression of the phenomenon in which the combined light LW having exited out of the light diffuser 740 unevenly diffuses in a particular direction when the combined light LW travels toward the collimator 730. The efficiency of use of the combined light LW can thus be sufficiently ensured without an unnecessary increase in the size of the collimator 730.

The projector 10 according to the present embodiment includes the illuminator 700 according to the present embodiment, the light modulators 400R, 400G, and 400B, which modulate the light containing the combined light LW output from the illuminator 700, and the projection optical apparatus 600, which projects the light modulated by the light modulators 400R, 400G, and 400B.

According to the present embodiment, the projector 10 excels in light utilization efficiency.

Second Embodiment

A second embodiment of the present disclosure will be described below with reference to FIG. 14.

The basic configuration of the projector according to the second embodiment is the same as that according to the first embodiment but differs therefrom in terms of the configuration of the illuminator. The basic configuration of the projector will therefore not be described.

Figure 14:
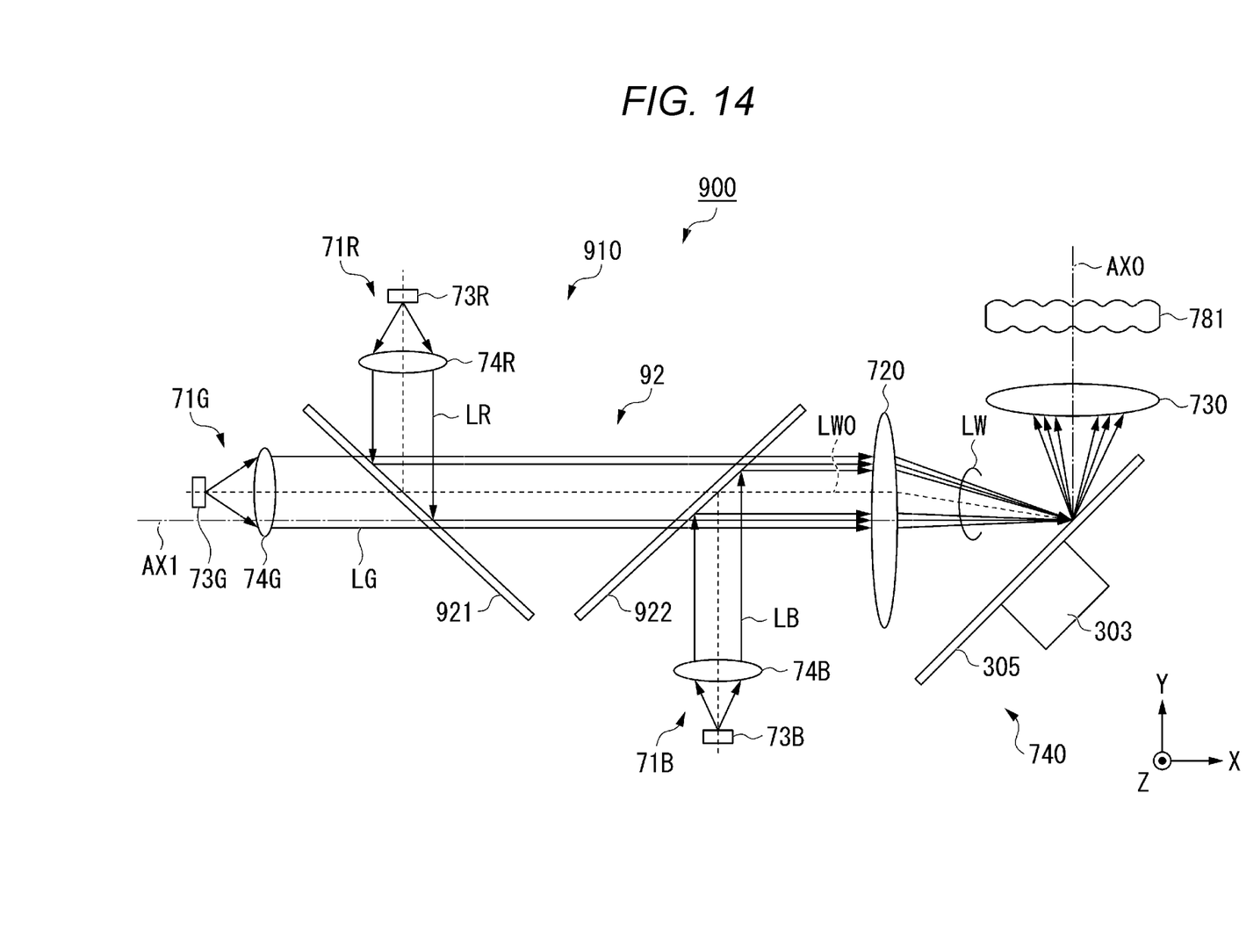
FIG. 14 is a schematic configuration diagram of the illuminator according to a second embodiment.

FIG. 14 is a schematic configuration diagram of an illuminator 900 according to the second embodiment.

In FIG. 14, components common to those in FIG. 1 used in the first embodiment have the same reference characters and will not be described.

The illuminator 900 according to the present embodiment includes a light source apparatus 910, the light collector 720, the light diffuser 740, the collimator 730, and the multi-lens array 781, as shown in FIG. 14. The light source apparatus 910 includes the red light source 71R, the green light source 71G, the blue light source 71B, and a light combining member 92.

The light combining member 92 includes a first dichroic mirror 921 and a second dichroic mirror 922. The first dichroic mirror 921 and the second dichroic mirror 922 are each disposed in a direction that intersects with each of the axes X and Y at 45°. The first dichroic mirror 921 reflects the red light LR and transmits the green light LG. The second dichroic mirror 922 reflects the blue light LB and transmits the green light LG and the red light LR. The first dichroic mirror 921 and the second dichroic mirror 922 are disposed along the optical axis AX1.

Also in the light source apparatus 910 according to the present embodiment, as in the first embodiment, the combined light LW is output from a position shifted toward the positive end of the direction Y from the optical axis AX1 of the light collector 720. That is, a chief ray LW0 of the combined light LW output from the light source apparatus 910 is shifted from the optical axis AX1 toward the positive end of the direction Y. The incidence position where the chief ray LW0 of the combined light LW is incident on the light collector 720 is thus shifted from the optical axis AX1 of the light collector 720 toward the side where the collimator 730 is disposed (positive end of direction Y). The other configurations of the illuminator 900 are the same as those in the first embodiment.

Effects of Second Embodiment

Also in the illuminator 900 according to the present embodiment, the same effects as those provided by the first embodiment can be provided, such as sufficiently ensuring the efficiency of use of the combined light LW without an increase in the size of the collimator 730.

The technical scope of the present disclosure is not limited to the embodiments described above, and a variety of changes can be made thereto to the extent that the changes do not depart from the intent of the present disclosure. An aspect of the present disclosure can relate to an appropriate combination of the characteristic portions in the embodiments described above.

For example, in place of the configuration in the first embodiment shown in FIG. 1, and on the assumption that the positional relationship between the color light sources and the light combining member is the same as that in Comparative Example shown in FIG. 4, the color light sources and the light combining member as a whole may be shifted toward the side where the collimator is disposed with respect to the optical axis of the light collector, that is, toward the positive end of the direction Y. This configuration can also shift the incidence position of the chief ray of the combined light from the optical axis of the light collector toward the side where the collimator is disposed, that is, toward the positive end of the direction Y.

In addition to the above, the specific descriptions of the shapes, the numbers, the arrangements, the materials, and other factors of the components of the illuminator and the projector are not limited to those in the embodiments described above and can be changed as appropriate. The aforementioned embodiments have been described with reference to the case where the illuminator according to the present disclosure is incorporated in a projector using liquid crystal panels, but not necessarily. The illuminator according to the present disclosure may be used in a projector using a digital micromirror device as each of the light modulators. The projector may not include a plurality of light modulators and may instead be a single-panel projector including only one light modulator.

The aforementioned embodiments have been described with reference to the case where the illuminator according to the present disclosure is incorporated in a projector, but not necessarily. The illuminator according to the present disclosure may be used as a lighting apparatus, a headlight of an automobile, and other components.

SUMMARY OF PRESENT DISCLOSURE

The present disclosure will be summarized below as additional remarks.

Additional Remark 1

An illuminator including a first light source that emits first light that belongs to a first wavelength band, a second light source that emits second light that belongs to a second wavelength band different from the first wavelength band, a light combining member that combines the first light and the second light with each other and causes the combined light to exit out of the light combining member, a light diffuser that diffuses the combined light that exits out of the light combining member, a light collector that is provided between the light combining member and the light diffuser and directs the combined light in the form of a spot toward the light diffuser, and a collimator that parallelizes the combined light that exits out of the light diffuser, the light diffuser including a diffusion plate having a diffusion surface that diffusively reflects the combined light, and a driver that rotates the diffusion plate around an axis of rotation that intersects with the diffusion surface, the diffusion surface inclining with respect to an optical axis of the light collector, and an incidence position where a chief ray of the combined light is incident on the light collector is shifted with respect to the optical axis of the light collector toward a side where the collimator is disposed.

The configuration described above allows suppression of the phenomenon in which the combined light having exited out of the light diffuser unevenly diffuses in a particular direction when the combined light LW travels toward the collimator. The efficiency of use of the combined light can thus be sufficiently ensured without an unnecessary increase in the size of the collimator.

Additional Remark 2

The illuminator described in Additional remark 1, in which an amount of shift of the incident position of the chief ray from the optical axis is greater than or equal to ½ of a luminous flux diameter of the combined light.

According to the configuration described above, the spread of the combined light having exited out of the light diffuser in one direction can be approximately equal to the spread in the other direction.

Additional Remark 3

The illuminator described in Additional remark 1 or 2, in which an angle of inclination of the diffusion surface with respect to the optical axis is 45°.

According to the configuration described above, the chief ray of the combined light incident on the diffusion surface can be made substantially perpendicular to the chief ray of the combined light that exits via the diffusion surface, whereby the configuration of the illuminator including a reflective diffusion plate can be simplified.

Additional Remark 4

The illuminator described in any one of Additional remarks 1 to 3, in which the diffusion surface has an uneven structure including a plurality of protrusions and a plurality of recesses, and in a cross section of the diffusion surface taken along a first direction, an overall length along the first direction of a set of one of the protrusions and one of the recesses adjacent to each other differs from the overall length along the first direction of another set of one of the protrusions and one of the recesses adjacent to each other.

According to the configuration described above, the diffusion surface can be configured to have protrusions and recesses that constitute the uneven structure and are arranged at random intervals, whereby the coherence of the combined light can be reduced. Speckle noise in an image formed by the projector can thus be effectively suppressed.

Additional Remark 5

The illuminator described in any one of Additional remarks 1 to 4, in which the diffusion surface has an uneven structure including a plurality of protrusions and a plurality of recesses, and in a cross section of the diffusion surface taken along a first direction, an overall shape of a set of one of the protrusions and one of the recesses adjacent to each other differs from the overall shape of another set of one of the protrusions and one of the recesses adjacent to each other.

According to the configuration described above, the diffusion surface can be configured to have protrusions and recesses that constitute the uneven structure and have random shapes, whereby the coherence of the combined light can be reduced. Speckle noise in an image formed by the projector can thus be effectively suppressed.

Additional Remark 6

The illuminator described in any one of Additional remarks 1 to 5, in which the first light and the second light are each linearly polarized light, and the combined light that exits out of the light combining member is formed of the first light and the second light having polarization directions that coincide with each other.

According to the configuration described above, illuminator light optimum for a light modulator using polarized light, such as a liquid crystal panel, can thus be formed.

Additional Remark 7

The illuminator described in Additional remark 6, in which the diffusion surface has an uneven structure including a plurality of protrusions and a plurality of recesses, and the uneven structure reflects once the combined light that exits out of the light combining member and causes the reflected combined light to exit toward the collimator.

According to the configuration described above, the combined light having exited out of the light combining member is not reflected multiple times off the diffusion surface, so that disturbance of the polarization of the combined light can be suppressed.

Additional Remark 8

A projector including the illuminator described in any of Additional remarks 1 to 7, a light modulator that modulates light containing the combined light outputted from the illuminator, and a projection optical apparatus that projects the light modulated by the light modulator.

According to the configuration described above, a projector having high light usage efficiency can be achieved.

What is claimed is:

1. An illuminator comprising:
   a first light source that emits first light having a first wavelength band;
   a second light source that emits second light having a second wavelength band different from the first wavelength band;
   a light combining member that combines the first light and the second light with each other and emits combined light;
   a light diffuser that diffuses the combined light emitted from the light combining member;
   a light collector that is disposed between the light combining member and the light diffuser and directs the combined light in the form of a spot toward the light diffuser; and
   a collimator that parallelizes the combined light emitted from the light diffuser,
   wherein the light diffuser includes
   a diffusion plate having a diffusion surface that diffusively reflects the combined light, and
   a driver that rotates the diffusion plate around an axis of rotation intersecting the diffusion surface,
   the diffusion surface inclines with respect to an optical axis of the light collector, and
   an incidence position where a chief ray of the combined light is incident on the light collector is shifted with respect to the optical axis of the light collector toward a side where the collimator is disposed.

2. The illuminator according to claim 1,
   wherein an amount of shift of the incident position of the chief ray from the optical axis is greater than or equal to ½ of a luminous flux diameter of the combined light.

3. The illuminator according to claim 1,
   wherein an angle of inclination of the diffusion surface with respect to the optical axis is 45°.

4. The illuminator according to claim 1,
   wherein the diffusion surface has an uneven structure including a plurality of protrusions and a plurality of recesses, and
   in a cross section of the diffusion surface taken along a first direction, an overall length along the first direction of a set of one of the protrusions and one of the recesses adjacent to each other differs from an overall length along the first direction of another set of one of the protrusions and one of the recesses adjacent to each other.

5. The illuminator according to claim 1,
   wherein the diffusion surface has an uneven structure including a plurality of protrusions and a plurality of recesses, and
   in a cross section of the diffusion surface taken along a first direction, an overall shape of a set of one of the protrusions and one of the recesses adjacent to each other differs from an overall shape of another set of one of the protrusions and one of the recesses adjacent to each other.

6. The illuminator according to claim 1,
wherein the first light and the second light are each linearly polarized light, and
the combined light emitted from the light combining member is formed of the first light and the second light having polarization directions that coincide with each other.

7. The illuminator according to claim 6,
wherein the diffusion surface has an uneven structure including a plurality of protrusions and a plurality of recesses, and
the uneven structure reflects once the combined light emitted from the light combining member and emits the reflected combined light toward the collimator.

8. A projector comprising:
the illuminator according to claim 1;
a light modulator that modulates light containing the combined light emitted from the illuminator, and
a projection optical apparatus that projects the light modulated by the light modulator.

\* \* \* \* \*